United States Patent [19]
Fumagalli et al.

[11] Patent Number: 5,114,344
[45] Date of Patent: May 19, 1992

[54] METHOD OF PLAYING AN EDUCATIONAL GAME

[75] Inventors: Lisbeth L. Fumagalli, Katonah, N.Y.; Katherine M. Love, R1, 16 Reynold's La.; Carrin Schechter, Bedford Rd., both of Katonah, N.Y. 10536

[73] Assignees: Katherine M. Love; Carrin Schechter, both of Katonah, N.Y.

[21] Appl. No.: 762,412

[22] Filed: Sep. 19, 1991

[51] Int. Cl.$^5$ .............................................. G09B 19/22
[52] U.S. Cl. ................................................... 434/128
[58] Field of Search ............... 434/128, 129; 273/429, 273/430, 431, 242, 243

[56] References Cited

U.S. PATENT DOCUMENTS

| | | | |
|---|---|---|---|
| 3,740,038 | 6/1973 | Feulner | 273/243 |
| 3,815,919 | 6/1974 | Cain et al. | 273/249 |
| 4,029,320 | 6/1977 | Hausman | 273/249 |
| 4,121,823 | 10/1978 | McBride | 273/249 |
| 4,214,755 | 7/1980 | Wysocki | 274/243 |

Primary Examiner—John J. Wilson
Assistant Examiner—Jeffrey A. Smith
Attorney, Agent, or Firm—Felfe & Lynch

[57] ABSTRACT

A method of playing an educational game concerning the environment in which a student enters a domino trail, takes a number of domino steps along the trail, stops at a domino to read educational information and takes an additional number of domino steps unless the student arrives at a stop sign. The student stops at the stop sign to enter an educational center staffed by a person who reviews educational facts with the student. The student has a plate with a portion corresponding to the educational facts reviewed and receives a cover piece for the corresponding portion.

9 Claims, 2 Drawing Sheets

© 1991 Ecology U.

© 1991 Ecology U.

© 1991 Ecology U.

METHOD OF PLAYING AN EDUCATIONAL GAME

BACKGROUND OF THE INVENTION

This invention relates to a method of playing an educational game and, more particularly, to a method of playing an educational game concerning the environment.

A board game is known in accordance with European patent application 0 007 322 for creating an interest in the environment in the players which is accomplished by having the players acquire awards for their active participation in the game and the knowledge obtained in connection with environmental science. A board is used having a path of movement delineated thereon with the path including alternate routes and being divided into a plurality of segments with the segments having various indicia associated therewith. Cards with indicia thereon are placed on the board and playing pieces are provided which are moved in accordance with a chance device in the form of a roulette wheel and simulated money is used in playing the educational game.

Another game is known containing a playing board, a die, question and answer cards, two card boxes and six player tokens and scoring wedges from the Trivial Pursuit ® master game rules of play.

Another board game is known from U.S. Pat. No. 4,214,755 which is intended for children and which serves as an instructional aid to promote their awareness of the environment and the problems of environmental pollution. The apparatus includes a game board having a playing field and a multiplicity of spaces formed thereon which define a continuous closed path along which tokens representing players are movable in random increments. The multiplicity of spaces includes a first group having designations thereon indicative of an area of environmental concern, a second group having monetary penalties specified thereon for environment harms and a third and fourth group of spaces having instructions thereon for selecting a card from a specified stack of cards having indicia thereon representative of a benefit or penalty assessed to the player who picks the card.

British Patent 2,189,159 discloses a game wherein the winner of the game is the first player to fill his display board with segmented picture-forming postcards. The postcards are acquired by correctly answering a question.

U.S. Pat. No. 3,740,038 relates to an environmental board game apparatus with identical land areas depicted thereon and a continuous playing path around its edge. Chance means direct movements of game pieces along the path and indications on the path direct selection of cards relating to land use.

It is an object of the present invention therefore to provide a new and improved method of playing an educational game which avoids one or more of the disadvantages and limitations of prior such games.

It is another object of the invention to provide a new and improved educational game in which the game is a large scale educational game using students, who may be children, moving along a step trail.

It is another object of the invention to provide a new and improved method of playing an educational game in which the students move along an environmental path from one environmental educational center to another.

It is another object of the invention to provide a new and improved method of playing an educational game concerning the environment in which the domino effect of environmental hazards or precautions is emphasized.

SUMMARY OF THE INVENTION

In accordance with the invention, a method of playing an educational game comprises determining by chance the number of steps a student will take upon entering a step trail. The student stops at a location upon taking the determined number of steps and reading educational information where stopped and the student takes an additional number of steps to enter an educational center staffed by a person who reviews educational facts with the student. The student has a carrier with a portion corresponding to the educational facts reviewed and receives a cover piece for the corresponding portion.

For a better understanding of the present invention, together with other and further objects thereof, reference is made to the accompanying drawings, and its scope will be pointed out in the appended claims.

BRIEF DESCRIPTION OF THE DRAWINGS

Referring now to the drawings.

DETAILED DESCRIPTION OF THE PREFERRED EMBODIMENT

Figure 1:
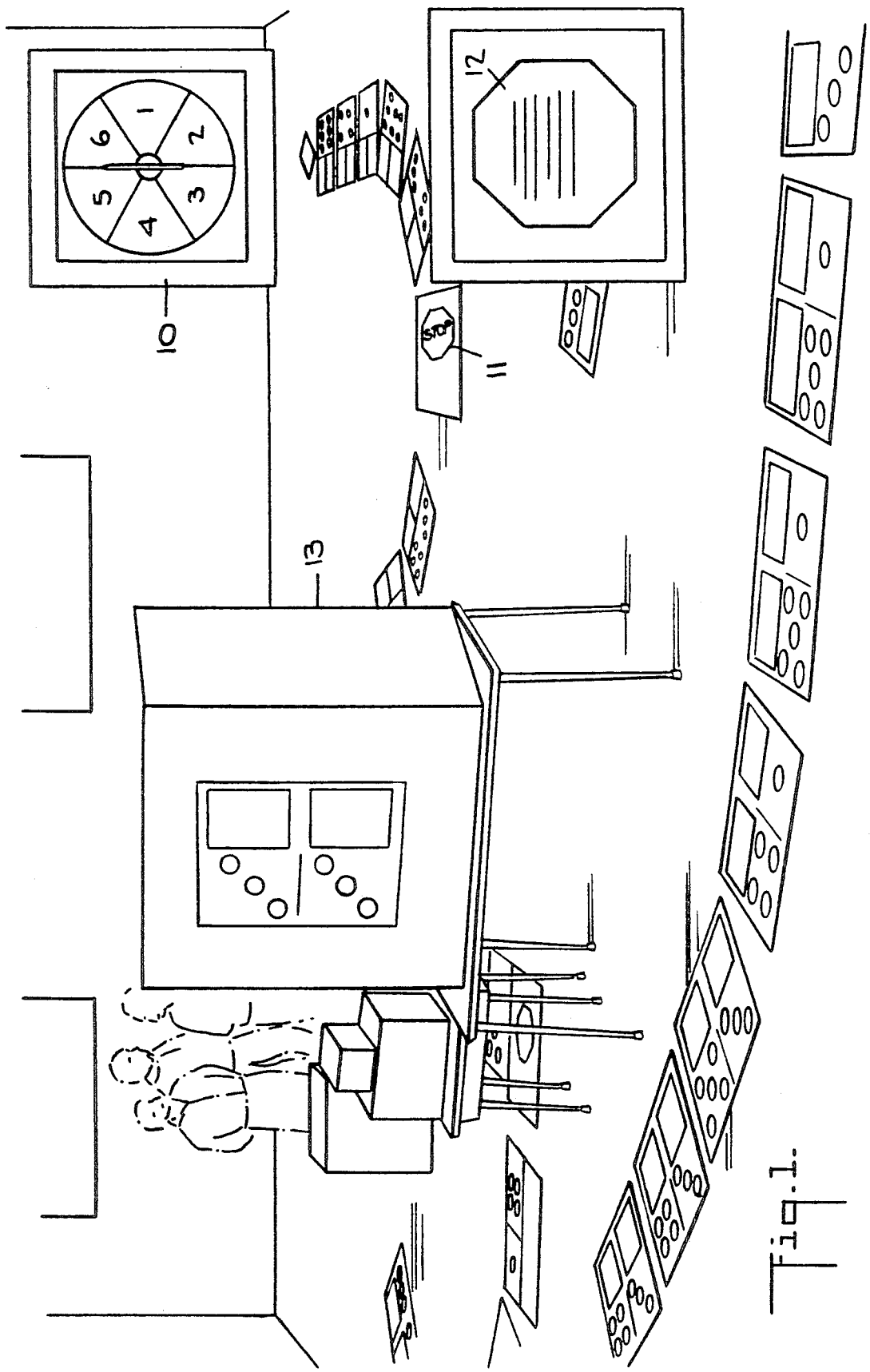
FIG. 1 is a fragmentary view of a domino trail preferably utilized in the method of playing the educational game.
Figure 2:
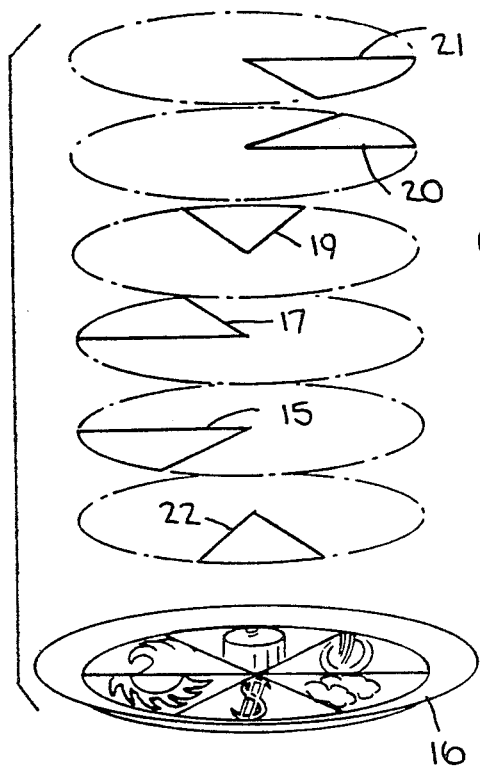
FIG. 2 is an exploded perspective view representing the plate and award portions which each student preferably receives.
Figure 3:
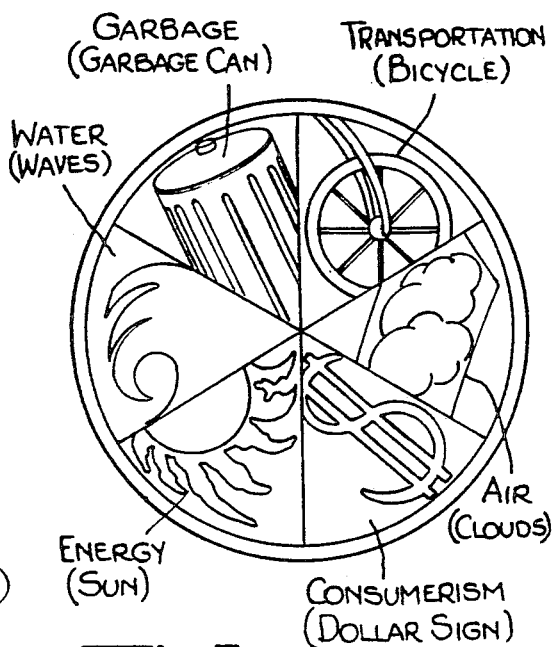
FIGS. 3-5 are plan views representing the plate and award portions which each student preferably receives.

Referring now more particularly to the drawings, FIG. 1 is a fragmentary, perspective view of a spinner and domino trail preferably utilized in playing the educational game in accordance with the invention. Each student preferably begins the game with a plate represented in FIGS. 2 and 3, imprinted with symbols representing different environmental centers. The student spins the spinner 10 of FIG. 1, thereby determining by chance the number of domino steps the student will take upon entering the domino trail. For example, if the student spins a 3, he advances along the domino trail to the third domino and reads the environmental fact associated with the third domino. That is, the student stops at a domino upon taking the determined number of domino steps and reads educational information at the domino where stopped. The environmental fact may be, for example, "Rainforests are like the 'lungs' of the planet Earth . . . humans need oxygen to breathe. Trees and rainforests give us this oxygen." The student takes an additional number of domino steps determined by the number on the domino where stopped unless in the course of taking any of the domino steps the student arrives at a stop sign. For example, the stop sign may be a red domino marked "STOP," such as domino 11 of FIG. 1. The student stops at the "STOP" sign to read the educational environmental hazard, for example, "You washed the car with a hose and left it dripping. Precious water is wasted which you might need for watering the lawn, bathing and drinking. Save water and keep our planet green." This information may appear on an octagonally-shaped placard facing the student but which appears in FIG. 1 as placard 12 in a reversed position for purposes of clarification.

The student then enters the first educational center staffed by a person who reviews educational facts with the student. For example, the first environmental educational center may be a "water" center. The student may first view a polluted pond (not shown) which may be a wading pool filled with water, garbage and dying fish. The student may read a stop sign (not shown) posted at the pond reading "Walk around the polluted pond three times." Once completed the student is at the water center 13. The person, who may be a parent, staffing this center reviews environmental facts with the student. These facts and related facts may be posted on a bulletin board-like surface which is facing the student. Examples are "5 gallons of water is used each time you flush a toilet." A 5 gallon fish tank filled with water and fish is shown. "Acid rain is not good for plants and trees. To them it tastes like lemon juice." Each student may, for example, be given a cup of lemon juice to sample. "Garbage in the water can kill animals." Several stuffed animals caught in plastic bags and plastic six-pack holders are displayed. "If oil is spilled in the water it pollutes and kills all the sea life." A jar of water with oil floating on top is shown.

When all information at the center has been discussed, each student may be given a multiple choice question. For example, "Throwing garbage in the water is bad because a) it might contain sugar which is bad for the fish teeth; b) you will not have anything to give to the garbageman; c) it can kill the fish and sea life." A sign may also read "Move ahead 3 dominos."

Figure 4:
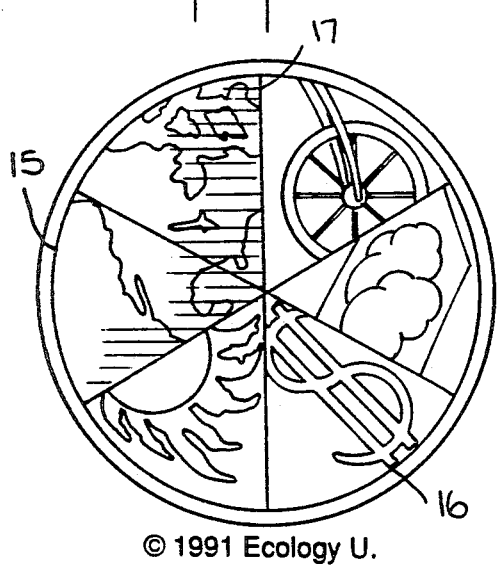

The student has now completed the water center and preferably is given a pie-shaped cover portion 15 (FIGS. 2 and 4) which fits on their plate 16 over the symbol (waves) illustrated for water. The pie-shaped cover portion bears indicia corresponding to a segment of the world.

Figure 5:
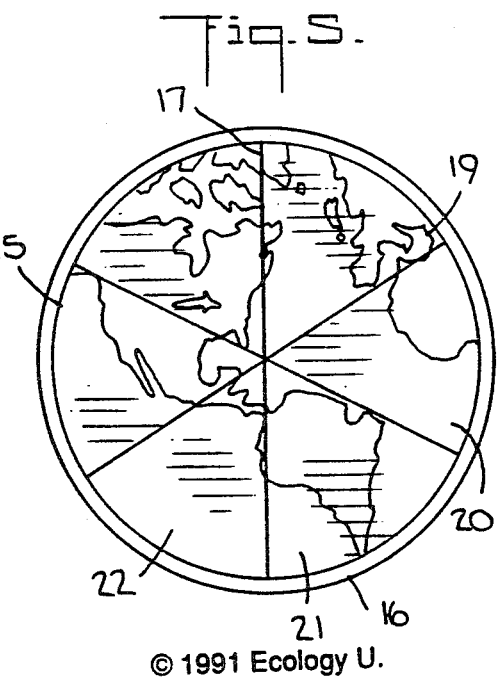

The student continues along the domino trail three dominos, reads the environmental fact, adds the number of dots on the domino landed on unless in the course of taking the predetermined number of domino steps, the student arrives at a second stop sign. The student stops at the second stop sign to enter a second environmental educational center staffed by a person who reviews different educational facts with the student. The student proceeds along the domino trail through, for example, five remaining centers, air, energy, garbage, transportation and consumerism. After completing each center the student's plate 16 represented in FIG. 3 has a portion corresponding to the different educational facts reviewed and the student receives an additional cover piece for each corresponding portion. After completing each center the student receives a pie-shaped piece 15, 17, 19, 20, 21 or 22 which preferably when completed as in FIG. 5 illustrates the world.

At the end of the domino trail, each student has read environmental facts, learned about environmental hazards, used his math skills as well as done physical activities. The students have been exposed to important information on water, air, energy, garbage, transportation and consumerism at the centers and have completed collecting the pie pieces from each center to form the planet Earth. The symbolism of each center and facets of the game (environmental facts, hazards and dominos) resulting in the completed pie pieces forming the planet Earth are discussed with the student.

The student may then be awarded an Elementary Environmental Awareness degree and sign a pledge reading, for example, "As a graduate of Ecology U., I know the difference that I can make. I pledge to be more environmentally aware from now on."

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of playing an educational game comprising:
   determining by chance the number of steps a student will take upon entering a step trail;
   the student stopping at a location upon taking the determined number of steps and reading educational information where stopped and the student taking an additional number of steps to enter an educational center staffed by a person who reviews educational facts with the student;
   the student having a carrier with a portion corresponding to the educational facts reviewed and receiving a cover piece for the corresponding portion.

2. A method of playing an educational game comprising:
   determining by chance the number of domino steps a student will take upon entering a domino trail;
   the student stopping at a domino upon taking the determined number of domino steps and reading educational information at the domino where stopped and the student taking an additional number of domino steps determined by the number on the domino where stopped unless in the course of taking any of said domino steps the student arrives at a stop sign;
   the student stopping at the stop sign to enter an educational center staffed by a person who reviews educational facts with the student;
   the student having a plate with a portion corresponding to the educational facts reviewed and receiving a cover piece for said corresponding portion.

3. A method in accordance with claim 2 in which the student then moves along the domino trail a predetermined number of domino steps unless in the course of taking the predetermined number of domino steps the student arrives at a second stop sign;
   the student stopping at the second stop sign to enter a second educational center staffed by a person who reviews different educational facts with the student;
   the student's plate having a second portion corresponding to the different educational facts reviewed and the student receiving a second cover piece for said second corresponding portion.

4. A method in accordance with claim 3 in which the domino trail includes a plurality of different environmental educational centers staffed by persons who review educational facts concerning different aspects of the environment at the different centers.

5. A method in accordance with claim 4 in which the student receives a plurality of cover portions bearing indicia corresponding to different segments of the world.

6. A method of playing an educational game concerning the environment comprising:
- determining by chance the number of domino steps a student will take upon entering a domino trail;
- the student stopping at a domino upon taking the predetermined number of domino steps and reading educational information concerning the environment at the domino where stopped and the student taking an additional number of domino steps determined by the number on the domino where stopped unless in the course of taking any of said domino steps the student arrives at a stop sign;
- the student stopping at the stop sign to enter an environmental educational center staffed by a person who reviews educational facts concerning the environment with the student;
- the student having a plate with a portion corresponding to the environmental educational facts reviewed and receiving a cover piece for said corresponding portion.

7. A method in accordance with claim 6 in which the student then moves along the domino trail a predetermined number of domino steps unless in the course of taking the predetermined number of domino steps the student arrives at a second stop sign;
- the student stopping at the second stop sign to enter a second environmental educational center staffed by a person who reviews different related educational facts concerning the environment with the student;
- the student's plate having a second portion corresponding to the different related educational
- facts reviewed and the student receiving a second cover piece for said second corresponding portion.

8. A method in accordance with claim 7 in which the student's plate has a plurality of portions bearing indicia corresponding to the different aspects of the environment.

9. A method in accordance with claim 6 in which the student stopping at the stop sign reads additional environmental educational information and then enters the environmental educational center.

* * * * *